United States Patent
Wei et al.

(10) Patent No.: US 8,477,593 B2
(45) Date of Patent: Jul. 2, 2013

(54) METHOD AND APPARATUS FOR SENDING SIGNALING FOR DATA TRANSMISSION IN A WIRELESS COMMUNICATION SYSTEM

(75) Inventors: Yongbin Wei, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1114 days.

(21) Appl. No.: 11/829,024

(22) Filed: Jul. 26, 2007

(65) Prior Publication Data

US 2008/0025267 A1 Jan. 31, 2008

Related U.S. Application Data

(60) Provisional application No. 60/834,118, filed on Jul. 28, 2006.

(51) Int. Cl.
  *H04J 11/00* (2006.01)
  *H04L 27/28* (2006.01)
  *H04L 5/12* (2006.01)

(52) U.S. Cl.
  USPC .............................. 370/208; 375/260; 375/265

(58) Field of Classification Search
  None
  See application file for complete search history.

(56) References Cited

U.S. PATENT DOCUMENTS

| | | | |
|---|---|---|---|
| 7,634,014 B2 * | 12/2009 | Park et al. | 375/260 |
| 2003/0152084 A1 | 8/2003 | Lee et al. | |
| 2005/0243940 A1 * | 11/2005 | Huh et al. | 375/260 |
| 2006/0007850 A1 * | 1/2006 | Park et al. | 370/209 |
| 2006/0018347 A1 | 1/2006 | Agrawal | |
| 2006/0028976 A1 | 2/2006 | Park et al. | |
| 2006/0062247 A1 | 3/2006 | Li | |
| 2006/0285479 A1 * | 12/2006 | Han et al. | 370/203 |
| 2006/0291583 A1 * | 12/2006 | Hammerschmidt et al. | 375/295 |
| 2007/0064692 A1 * | 3/2007 | Pi et al. | 370/389 |
| 2007/0153876 A1 | 7/2007 | Pi et al. | |

(Continued)

FOREIGN PATENT DOCUMENTS

| | | |
|---|---|---|
| EP | 1638271 | 3/2006 |
| JP | 2002528014 A | 8/2002 |

(Continued)

OTHER PUBLICATIONS

TIA/EIA/IS-856 cdma2000 High Rate Packet Data Air Interface Specification, Nov. 2000.

(Continued)

*Primary Examiner* — Marcus R Smith
(74) *Attorney, Agent, or Firm* — Kevin Cheatham

(57) ABSTRACT

Techniques for sending signaling for data transmission in a wireless communication system are described. A transmitter may process signaling for a data transmission based on a block code, a convolutional code, a transformation, etc. The signaling may comprise an identifier of an intended receiver for the data transmission and/or other information such as data rate, resource assignment, etc. The signaling for the data transmission may be mapped to a first set of tones in a time slot. Data for the data transmission may be mapped to a second set of tones in the time slot. The entire signaling may be sent on the first set of tones. Alternatively, the first set of tones may be selected from among multiple sets of tones or pseudo-randomly selected from among available tones based on a first part of the signaling. A second part of the signaling may be sent on the first set of tones.

34 Claims, 13 Drawing Sheets

U.S. PATENT DOCUMENTS

| | | | | |
|---|---|---|---|---|
| 2007/0237068 A1* | 10/2007 | Bi et al. | | 370/208 |
| 2008/0063105 A1* | 3/2008 | Gu et al. | | 375/265 |
| 2008/0168337 A1* | 7/2008 | Gaal et al. | | 714/784 |
| 2009/0180577 A1 | 7/2009 | Aubourg | | |
| 2010/0284377 A1 | 11/2010 | Wei et al. | | |

FOREIGN PATENT DOCUMENTS

| | | |
|---|---|---|
| JP | 2006094484 A | 4/2006 |
| RU | 2110159 | 4/1998 |
| RU | 2235430 | 8/2004 |
| WO | WO0016586 A1 | 3/2000 |
| WO | 0022858 A1 | 4/2000 |
| WO | WO 2005041448 A1 * | 5/2005 |
| WO | WO2006007318 A1 | 1/2006 |

OTHER PUBLICATIONS

Ericsson: "E-UTRA Downlink Control Signalling—Open Issues." R1-061365. TSG-RAN WG1 45, Shanghai, China, May 12, 2006.

Ericsson: "Downlink Control Signaling—Mapping to Physical Channel Resources," R1-060997, TSG-RAN WG1 #44bis, Athens, Greece, Mar. 31, 2006.

NTT Docomo, Fujitsu, Mitsubishi Electric, NEC, Panasonic, Sharp, Toshiba Corporation: L1/L2 Control Channel Structure for E-UTRA Downlink, R1-061181, 3GPP TSG RAN WG1 Meeting 45, Shanghai, China, May 12, 2006.

Samsung: "Downlink Control Signalling Multiplexing," R1-061698, 3GPP TSG RAN WG1 LTE AH Meeting, Cannes, France, Jun. 30. 2006.

Sharp: "UE Identity in L1/L2 Downlink Control Signalling," R1-061684, 3GPP TSG-RAN WG1 AD HOC, Cannes France. Jun. 30.2006.

International Search Report—PCT/US07/074628, International Search Report—European Patent Office, Sep. 15, 2008.

Written Opinion—PCT/US07/074628, International Search Authority—European Patent Office, Sep. 15, 2008.

Motorola: R1-060009, E-UTRA Downlink Control Channel Design and Performance and TP, 3GPP TSG RAN1 LTE AD HOC, Helsinki, Finland, Jan. 23-25, 2006.

Partial International Search Report—PCT/US07/074628, International Search Authority—European Patent Office, Apr. 29, 2008.

Kawamoto J., et al., "Comparison of Transmission Methods Using MIMO Channel Achieving Peak Throughput of 1Gbps in VSF-OFCDM Forward Link," Technical Report of the Institute of Electronics, Information and Communication Engineers, Apr. 11, 2003, vol. 103, No. 14, pp. 83-90, RCS 2003-23.

Motorola,"Uplink Numerology and Frame Structure", 3GPP TAG RAN1 #41 Meeting R1-050397, May 13, 2005.

Taiwan Search Report—TW096127678—TIPO—Mar. 5, 2012.

* cited by examiner

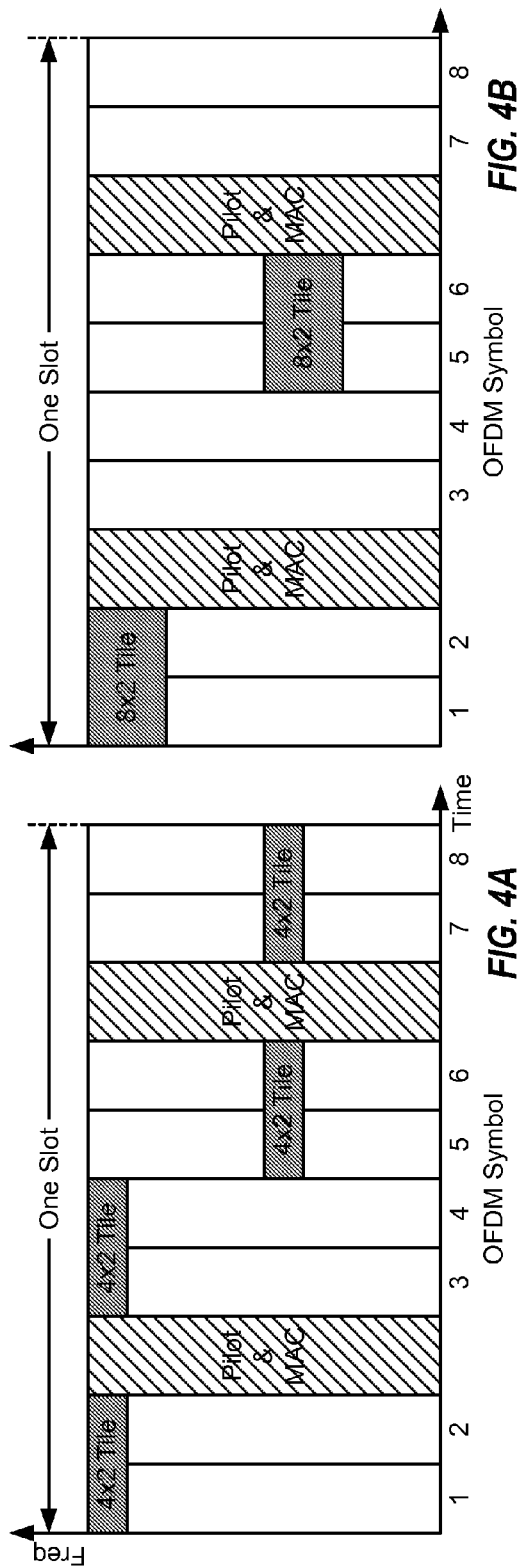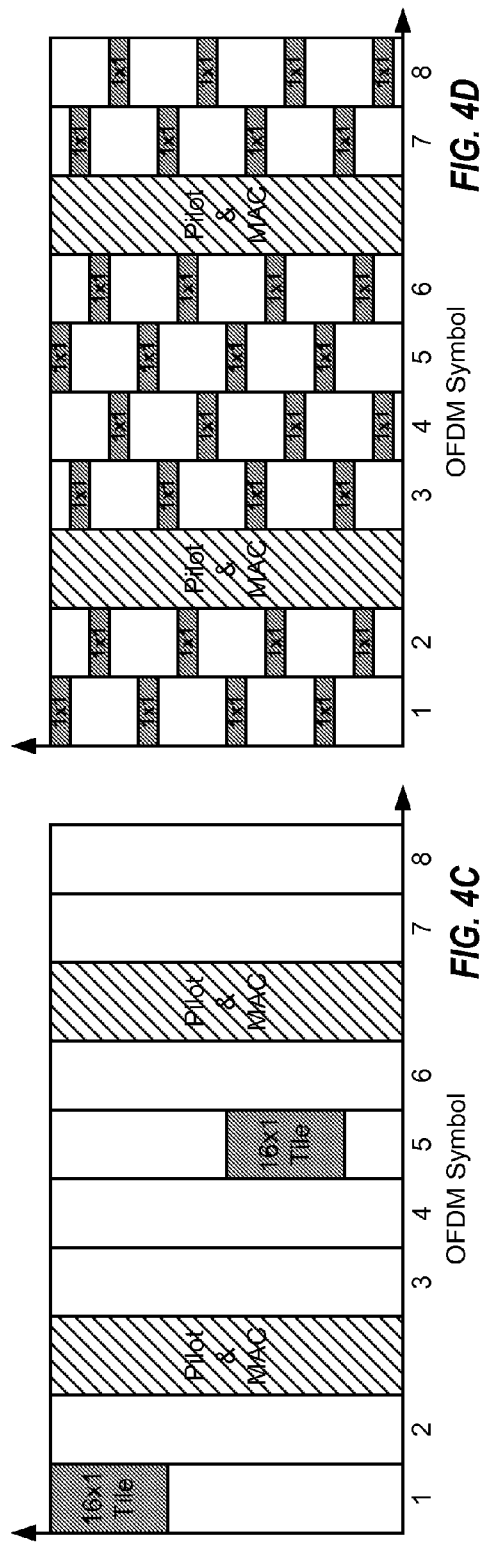

METHOD AND APPARATUS FOR SENDING SIGNALING FOR DATA TRANSMISSION IN A WIRELESS COMMUNICATION SYSTEM

CLAIM OF PRIORITY UNDER 35 U.S.C. §119

The present Application for Patent claims priority to Provisional Application Ser. No. 60/834,118, entitled "METHOD AND APPARATUS FOR PREAMBLE CONFIGURATION IN WIRELESS COMMUNICATION SYSTEMS," filed Jul. 28, 2006, assigned to the assignee hereof, and expressly incorporated herein by reference.

BACKGROUND

1. Field

The present disclosure relates generally to communication, and more specifically to techniques for sending signaling in a wireless communication system.

2. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A base station may transmit data to one or more terminals on the forward link and/or receive data from one or more terminals on the reverse link at any given moment. The base station may send signaling to indicate which terminals are scheduled for data transmission and to convey information pertinent to receive the data transmission. It is desirable to send the signaling as efficiently as possible since this signaling represents overhead. Furthermore, it is desirable to send the signaling such that the terminals can reliably receive the signaling.

There is therefore a need in the art for techniques to efficiently and reliably send signaling in a wireless communication system.

SUMMARY

Techniques for sending signaling for data transmission in a wireless communication system are described herein. In one aspect, a transmitter (e.g., a base station) may process signaling for a data transmission based on a block code, a convolutional code, a transformation, etc. The signaling may comprise an identifier of an intended receiver (e.g., an access terminal) of the data transmission and/or other information such as data rate, resource assignment, etc., for the data transmission. The signaling for the data transmission may be mapped to a first set of tones in a time slot. Data for the data transmission may be mapped to a second set of tones in the time slot. The first and second sets of tones may be among the tones assigned for the data transmission, which may be all or a subset of the tones available for use. The entire signaling may be sent on the first set of tones. Alternatively, the first set of tones may be selected from among multiple sets of tones or pseudo-randomly selected from among the assigned tones based on a first part of the signaling. A second part of the signaling may then be sent on the first set of tones. The number of tones in the first set and/or the transmit power for the signaling may be selected based on channel conditions.

In another aspect, the receiver (e.g., the access terminal) may obtain received symbols for the first set of tones in the time slot and may process the received symbols to obtain detected signaling. The receiver may determine whether or not to process the second set of tones in the time slot for the data transmission based on the detected signaling. If the detected signaling indicates that data transmission is sent, then the receiver may determine the second of tones based on the detected signaling and may further process received symbols for the second set of tones (e.g., based on the data rate from the detected signaling) to recover the transmitted data.

Various aspects and features of the disclosure are described in further detail below.

BRIEF DESCRIPTION OF THE DRAWINGS

FIGS. 4A to 4D show four additional tone structures for sending signaling.

DETAILED DESCRIPTION

The transmission techniques described herein may be used for various wireless communication systems such as CDMA, TDMA, FDMA, OFDMA, and SC-FDMA systems. The terms "system" and "network" are often used interchangeably. A CDMA system may implement a radio technology such as cdma2000, Universal Terrestrial Radio Access (UTRA), etc. CDMA2000 covers IS-2000, IS-95 and IS-856 standards. UTRA includes Wideband CDMA (W-CDMA) and Low Chip Rate (LCR). A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. These various radio technologies and standards are known in the art. UTRA, E-UTRA and GSM are described in documents from an organization named "3rd Generation Partnership Project" (3GPP). cdma2000 is described in documents from an organization named "3rd Generation Partnership Project 2" (3GPP2).

For clarity, certain aspects of the transmission techniques are described below for a High Rate Packet Data (HRPD) system that implements IS-856. HRPD is also referred to as Evolution-Data Optimized (EV-DO), Data Optimized (DO), High Data Rate (HDR), etc. For clarity, HRPD terminology is used in much of the description below.

Figure 1:
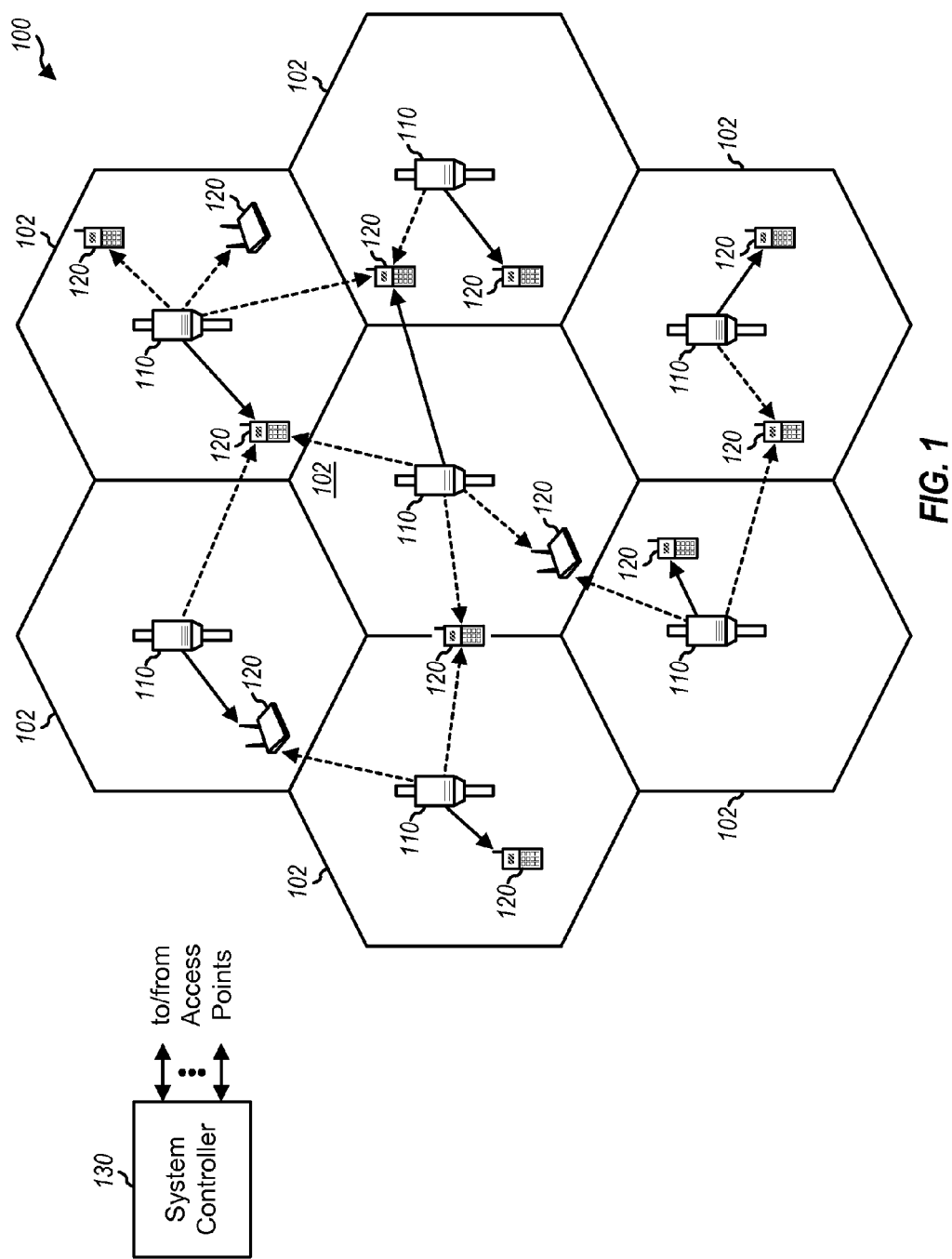
FIG. 1 shows a wireless communication system.

FIG. 1 shows a wireless communication system 100 with multiple access points 110 and multiple access terminals 120. An access point is generally a fixed station that communicates with the access terminals and may also be referred to as a base station, a Node B, etc. Each access point 110 provides communication coverage for a particular geographic area 102 and supports communication for the access terminals located within the coverage area. Access points 110 may couple to a system controller 130 that provides coordination and control for these access points. System controller 130 may include one or more network entities such as a Base Station Controller (BSC), a Packet Control Function (PCF), a Packet Data Serving Node (PDSN), etc.

Access terminals 120 may be dispersed throughout the system, and each access terminal may be stationary or mobile. An access terminal may also be referred to as a terminal, a mobile station, a user equipment, a subscriber unit, a station, etc. An access terminal may be a cellular phone, a personal digital assistant (PDA), a wireless device, a handheld device, a wireless modem, a laptop computer, etc. In HRPD, an access terminal may receive data transmission on the forward link from one access point at any given moment and may send data transmission on the reverse link to one or more access points. The forward link (or downlink) refers to the communication link from the access points to the access terminals, and the reverse link (or uplink) refers to the communication link from the access terminals to the access points.

Figure 2:
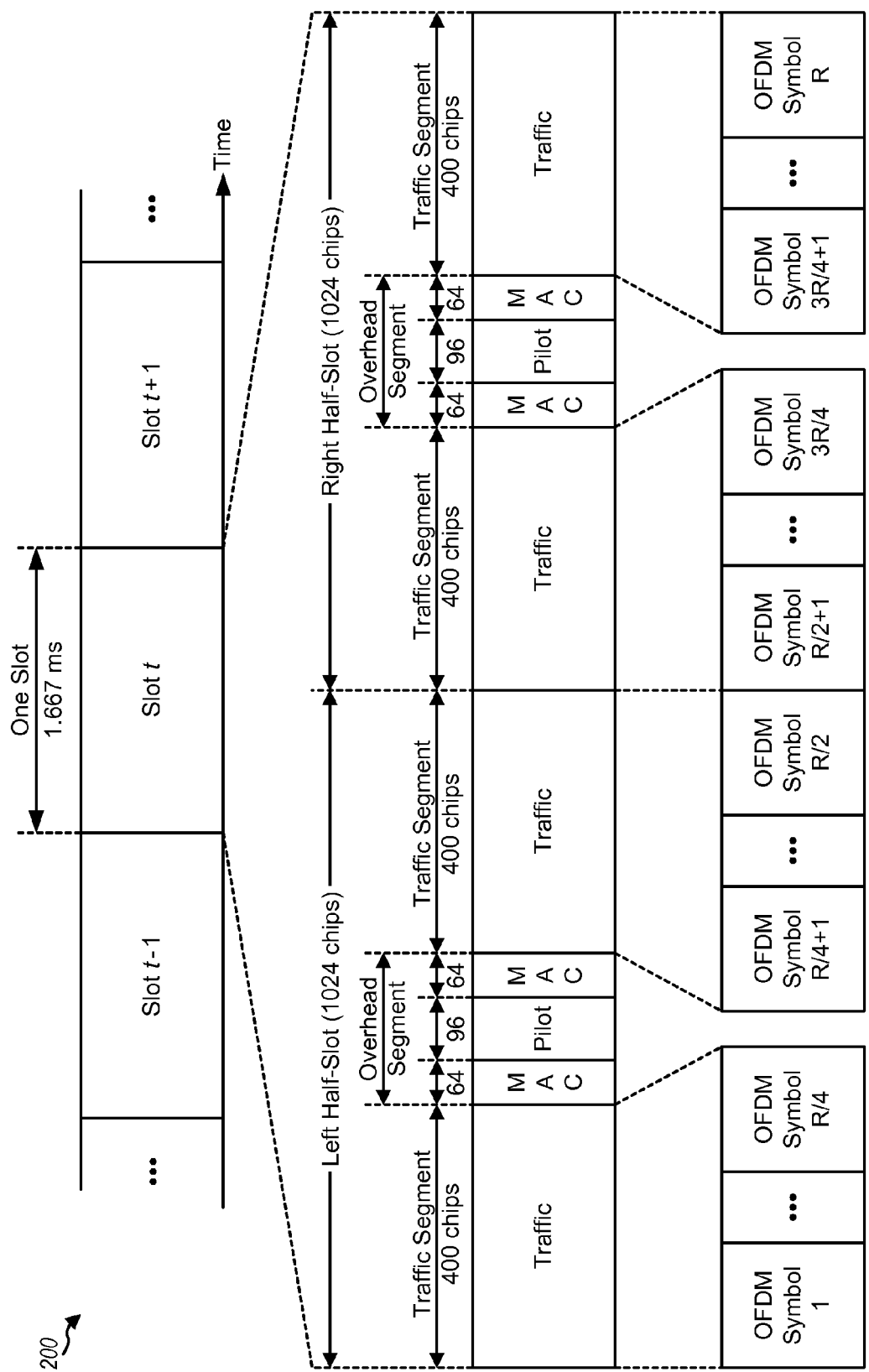
FIG. 2 shows an example slot structure.

FIG. 2 shows a slot structure 200 that may be used for transmission on the forward link. The transmission timeline may be partitioned into slots. Each slot may have a predetermined time duration. In one design, each slot has a duration of 1.667 milliseconds (ms) and spans 2048 chips, with each chip having a duration of 813.8 nanoseconds (ns) for a chip rate of 1.2288 megachips/second (Mcps). Each slot may be divided into two identical half-slots. Each half-slot may include (i) an overhead segment composed of a pilot segment at the center of the half-slot and two Media Access Control (MAC) segments on both sides of the pilot segment and (ii) two traffic segments on both sides of the overhead segment. The traffic segments may also be referred to as a traffic channel, data segments, data fields, etc. The pilot segment may have a duration of 96 chips and may carry pilot that may be used for initial acquisition, frequency and phase recovery, timing recovery, channel estimation, radio combining, etc. Each MAC segment may have a duration of 64 chips and may carry signaling such as, e.g., reverse power control (RPC) information, channel structure, frequency, transmit power, coding and modulation, etc. Each traffic segment may have a duration of 400 chips and may carry traffic data (e.g., unicast data for specific access terminals, broadcast data, etc.) and/or signaling.

It may be desirable to use orthogonal frequency division multiplexing (OFDM) and/or single-carrier frequency division multiplexing (SC-FDM) for the traffic segments. OFDM and SC-FDM partition the system bandwidth into multiple orthogonal subcarriers, which are also referred to as frequency bins, etc. Each subcarrier may be modulated with data. In general, modulation symbols are sent in the frequency domain with OFDM and in the time domain with SC-FDM. OFDM and SC-FDM have certain desirable characteristics such as the ability to readily combat intersymbol interference (ISI) caused by frequency selective fading. OFDM can also efficiently support multiple-input multiple-output (MIMO) and Spatial Division Multiple Access (SDMA), which may be applied independently on each subcarrier. For clarity, the use of OFDM for sending data and signaling in the traffic segments is described below.

It may also be desirable to support OFDM while retaining backward compatibility with earlier HRPD Revisions. In HRPD, the pilot and MAC segments may be demodulated by all active terminals at all times whereas the traffic segments may be demodulated by only the terminals being served. Hence, backward compatibility may be achieved by retaining the pilot and MAC segments and modifying the traffic segments.

FIG. 2 shows a design that supports OFDM using the HRPD slot structure. In this design, R OFDM symbols may be sent in a slot, or R/4 OFDM symbols per traffic segment, where R may be any suitable integer value. In general, OFDM symbols may be generated based on various OFDM symbol numerologies. Each OFDM symbol numerology is associated with specific values for pertinent parameters such as OFDM symbol duration, number of subcarriers, cyclic prefix length, etc. Table 1 lists three OFDM symbol numerologies and gives the parameter values for each numerology, in accordance with one design.

TABLE 1

| Parameter | | Numerology | | | Unit |
| --- | --- | --- | --- | --- | --- |
| | | 1 | 2 | 3 | |
| Number of subcarriers | N | 180 | 90 | 360 | |
| Cyclic prefix length | C | 20 | 10 | 40 | chips |
| OFDM symbol duration | | 200 | 100 | 400 | chips |
| Number of OFDM symbols | R | 8 | 16 | 4 | per slot |
| Number of tones | T | 1440 | 1440 | 1440 | per slot |

In the design shown in Table 1, each slot may include a total of T=1440 tones. A tone may correspond to one subcarrier in one symbol period and may be used to send one modulation symbol. A tone may also be referred to as a resource element, a transmission unit, etc. Some of the T tones may be reserved for pilot, and the remaining tones may be used for data and/or signaling.

An access point may send data to one or more access terminals in each slot. The access point may also send signaling in each slot. The signaling may also be referred to as preamble, scheduling information, control information, overhead information, etc. In general, the signaling may comprise any information to support data transmission on the forward and/or reverse links. The signaling may be for any number of access terminals and comprise any type of information.

In one design, the signaling may comprise information indicating which access terminal(s) are scheduled for data transmission on the forward link in a given slot. The signaling may also comprise information for parameters pertinent to the scheduled terminal(s) to receive the data transmission sent on the forward link. For example, the signaling may comprise information related to the data rate used for a scheduled access terminal. This access terminal may estimate the forward link channel quality for the access point and may determine a data rate for data transmission to the access terminal based on the estimated channel quality and/or other factors. The access terminal may send this data rate on a data rate control (DRC) channel to the access point. The access point may use the data rate sent by the access terminal or may select another data rate. The access point may send a rate adjustment that may indicate the difference (if any) between the data rate selected by the access point and the data rate provided by the access terminal. The rate adjustment may allow the access point to overwrite the DRC feedback from the access terminal. The rate adjustment may also provide the access terminal with the actual data rate used by the access point, so that the access terminal can avoid having to decode for different possible data rates that can be used for data transmission.

In one design, the signaling for a scheduled access terminal may include the following:
  8-bit MAC_ID of the scheduled access terminal, and
  2-bit rate adjustment for the scheduled access terminal.

The access terminals communicating with the access point may be assigned unique MAC_IDs. Each access terminal may then be identified by its MAC_ID. The access terminals may also be identified based on other types of identifiers.

In another design, the signaling for a scheduled access terminal may include the following:
  8-bit MAC_ID of the scheduled access terminal,
  2-bit rate adjustment for the scheduled access terminal,
  2-bit assignment size indicator, and
  1-bit sticky assignment indicator.

The scheduled access terminal may be assigned a variable amount of resources for data transmission. The assignment size indicator may convey the amount of resources assigned to the access terminal for the data transmission. In one design, resources may be granted in units of tile, with each tile including a predetermined number of tones. For example, a slot may be partitioned into 6 tiles, and each tile may include 240 tones. The access terminal may be assigned 1, 2, 4 or 6 tiles, which may be conveyed by the 2-bit assignment size indicator. The specific tile(s) assigned to the access terminal may be determined based on the location of the signaling and/or conveyed by other means. The sticky assignment indicator may be set to 1 to indicate that the current resource assignment is ongoing or to 0 to indicate that the current resource assignment terminates after the current slot. The use of the sticky assignment indicator may avoid the need to send the same signaling in each slot for the same continuing resource assignment.

The signaling for a scheduled access terminal may be sent in various manners. In one design, the signaling may be sent in OFDM symbols during the traffic segments. The signaling may be sent on tones distributed across the system bandwidth to achieve frequency diversity and/or across multiple symbol periods to achieve time diversity.

Figure 3:
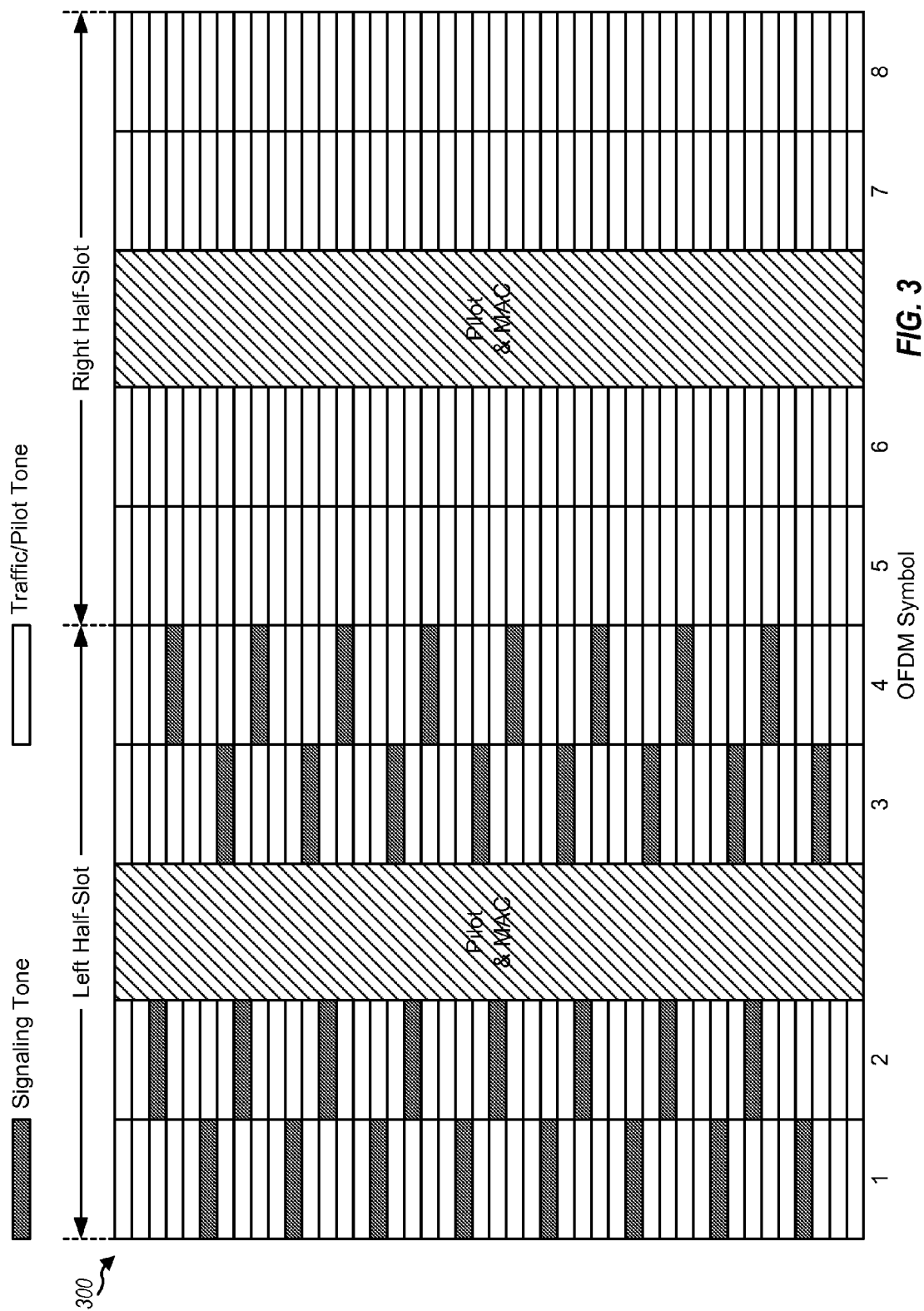
FIG. 3 shows a tone structure for sending signaling.

FIG. 3 shows a design of a tone structure 300 for sending signaling based on the 200-chip numerology 2 in Table 1. In this design, the signaling for an access terminal may be sent on a set of K tones that may be distributed across the entire system bandwidth and across one half-slot. In general, the set may include any number of tones, and K may be any value. The number of tones (K) may be selected based on a tradeoff between signaling overhead and signaling reliability. In one design, the set may include K=32 tones, which may be arranged in eight tones per symbol period for the 200-chip numerology 1 in Table 1 (as shown in FIG. 3), or four tones per symbol period for the 100-chip numerology 2, or 16 tones per symbol period for the 400-chip numerology 3. The tones may occupy different subcarriers in different OFDM symbol periods to increase frequency diversity, as shown in FIG. 3. In general, sending the signaling earlier in the slot may allow the access terminal to receive the signaling sooner and start preparing for processing the data transmission earlier. The signaling may thus be sent in the first OFDM symbol, the first traffic segment, the first half-slot, etc.

FIG. 4A shows a design of a signaling tone structure using 4×4 tiles. Each 4×4 tile may be composed of two 4×2 tiles occupying the same four subcarriers in two traffic segments. In this design, the signaling for an access terminal may be sent on 32 tones in two 4×4 tiles located in two half-slots.

FIG. 4B shows a design of a signaling tone structure using 8×2 tiles. In this design, the signaling for an access terminal may be sent on 32 tones in two 8×2 tiles located in two half-slots. Each tile may cover eight subcarriers and span the first two symbol periods in one half-slot.

FIG. 4C shows a design of a signaling tone structure using 16×1 tiles. In this design, the signaling for an access terminal may be sent on 32 tones in two 16×1 tiles located in two half-slots. Each tile may cover 16 subcarriers and span the first symbol period in one half-slot.

FIG. 4D shows a design of a signaling tone structure using 1×1 tiles. In this design, the signaling for an access terminal may be sent on 32 tones in 32 1×1 tiles located across the two half-slots. Each tile may cover one subcarrier and span one symbol period.

FIGS. 3 through 4D show some example tone structures for sending signaling on K=32 tones. Other tone structures may also be defined for sending signaling on different numbers of tones (e.g., K=16, 64, 128, etc.) and/or with different distributions of the K tones across frequency and time. Placing the K tones closer together in frequency and time may improve orthogonality among possible codewords sent for the signaling, which may improve decoding performance. Distributing the K tones across frequency and time may improve diversity. Signaling may be sent based on any tone structure selected for use.

In one design, the signaling for a scheduled access terminal may be sent on a designated set of tones among all tones assigned to the access terminal for data transmission. This designated set of tones may be fixed for a given slot but may change from slot to slot.

In another design, the signaling for a scheduled access terminal may be sent on one of multiple (S) sets of tones. The S sets may be defined based on all tones that may be used to send the signaling, e.g., all tones assigned to the access terminal for data transmission. The S sets may be disjoint so that each tone belongs in at most one set. The number of sets (S) may be dependent on the number of available tones and the number of tones (K) in each set. In one design, S=16 sets of tones may be formed for the left half-slot based on the numerologies shown in Table 1, with each set including K=32 tones. One of the S sets may be selected for use based on a first part of the signaling, and the selected set of tones may be used to send a remainder part of the signaling. The signaling may puncture (or replace) data on the selected set of tones.

Figure 5:
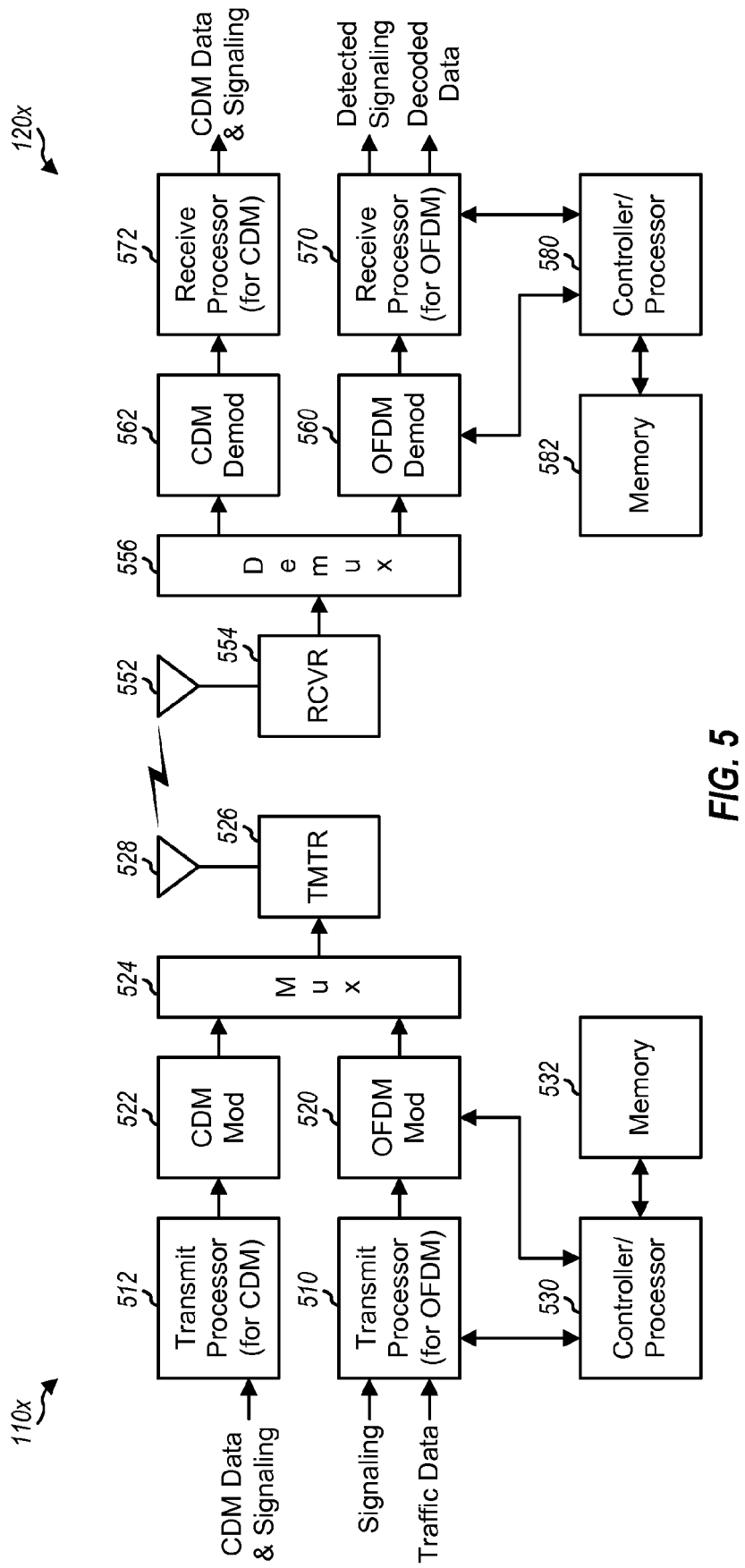
FIG. 5 shows a block diagram of an access point and an access terminal.

FIG. 5 shows a block diagram of a design of an access point 110x and an access terminal 120x, which are one of the access points and access terminals in FIG. 1. For simplicity, only processing units for transmission on the forward link are shown in FIG. 5. Also for simplicity, access point 110x and access terminal 120x are each shown with one antenna. In general, each entity may be equipped with any number of antennas.

At access point 110x, a transmit processor 510 may receive traffic data for one or more scheduled access terminals and signaling for the scheduled access terminal(s). Transmit processor 510 may process (e.g., encode, interleave, and symbol map) the traffic data, pilot, and signaling and provide data symbols, pilot symbols, and signaling symbols, respectively. A data symbol is a symbol for traffic data, a pilot symbol is a symbol for pilot, a signaling symbol is a symbol for signaling, and a symbol is typically a complex value. An OFDM modulator (Mod) 520 may receive the data, pilot, and signaling symbols from transmit processor 510, perform OFDM modulation on these symbols, and provide output samples for OFDM. A transmit processor 512 may receive and process traffic data, pilot, and/or overhead information to be sent with CDM. A CDM modulator 522 may perform CDM modulation on the output of transmit processor 512 and provide output samples for CDM. A multiplexer (Mux) 524 may multiplex the output samples from modulators 520 and 522, provide the output samples from OFDM modulator 520 during time periods in which OFDM symbols are sent (or OFDM time periods), and provide the output samples from CDM modulator 522 during time periods in which CDM data is sent (or CDM time periods). A transmitter (TMTR) 526 may process (e.g., convert to analog, amplify, filter, and frequency upconvert) the output samples from multiplexer 524 and generate a forward link signal, which may be transmitted via an antenna 528.

At access terminal 120x, an antenna 552 may receive the forward link signal from access point 110x and provide a received signal to a receiver (RCVR) 554. Receiver 554 may process (e.g., filter, amplify, frequency downconvert, and digitize) the received signal and provide received samples. A demultiplexer (Demux) 556 may provide the received samples in OFDM time periods to an OFDM demodulator (Demod) 560 and may provide the received samples in CDM time periods to a CDM demodulator 562. OFDM demodulator 560 may perform OFDM demodulation on the received samples and provide received signaling symbols and received data symbols, which are estimates of the signaling symbols and data symbols sent by access point 110x to access terminal 120x. A receive processor 570 may process the received signaling symbols to obtain detected signaling for access terminal 120x. Receive processor 570 may also process the received data symbols to obtain decoded data for access terminal 120x. CDM demodulator 562 may perform CDM demodulation on the received samples. A receive processor 572 may process the output of CDM demodulator 562 to recover information sent by access point 110x to access terminal 120x. In general, the processing by access terminal 120x is complementary to the processing by access point 110x.

Controllers/processors 530 and 580 may direct the operation at access point 110x and access terminal 120x, respectively. Memories 532 and 582 may store program codes and data for access point 110x and terminal 120x, respectively.

Figure 6:
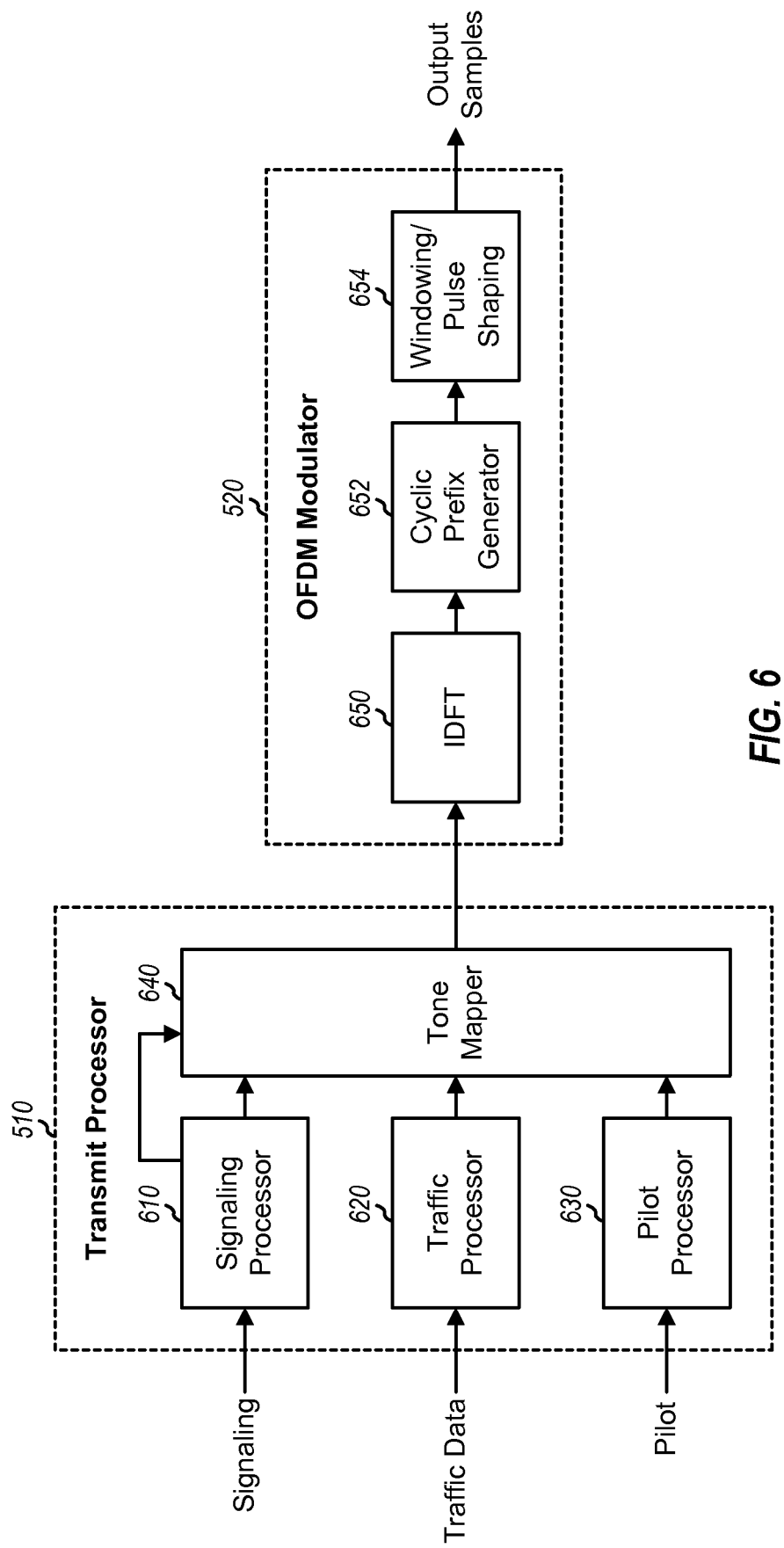
FIG. 6 shows a block diagram of a transmit processor and an OFDM modulator.

FIG. 6 shows a block diagram of a design of transmit processor 510 and OFDM modulator 520 at access point 110x in FIG. 5. Within transmit processor 510, a signaling processor 610 may process signaling for one or more scheduled access terminals and provide signaling symbols. A traffic processor 620 may process traffic data for the scheduled access terminal(s) and provide data symbols. A pilot processor 630 may process pilot and provide pilot symbols. A tone mapper 640 may receive the signaling, data, and pilot symbols and map these symbols to the proper tones. In each symbol period, tone mapper 640 may provide N symbols for N subcarriers to OFDM modulator 520.

Within OFDM modulator 520, an inverse discrete Fourier transform (IDFT) unit 650 may perform an N-point IDFT on the N symbols for the N subcarriers and provide a useful portion containing N time-domain samples. A cyclic prefix generator 652 may append a cyclic prefix by copying the last C samples of the useful portion and appending these C samples to the front of the useful portion. A windowing/pulse shaping filter 654 may filter the samples from generator 652 and provide an OFDM symbol composed of N+C samples, where N and C are dependent on the numerology selected for use.

For clarity, the processing of signaling for one scheduled access terminal (e.g., access terminal 120x) is described below. The signaling may include P bits, where P may be any integer value. In one design, the signaling may include P=10 bits and comprise an 8-bit MAC_ID and a 2-bit rate adjustment. In another design, the signaling may include P=13 bits and comprise an 8-bit MAC_ID, a 2-bit rate adjustment, a 2-bit assignment size indicator, and a 1-bit sticky assignment indicator.

Figure 7:
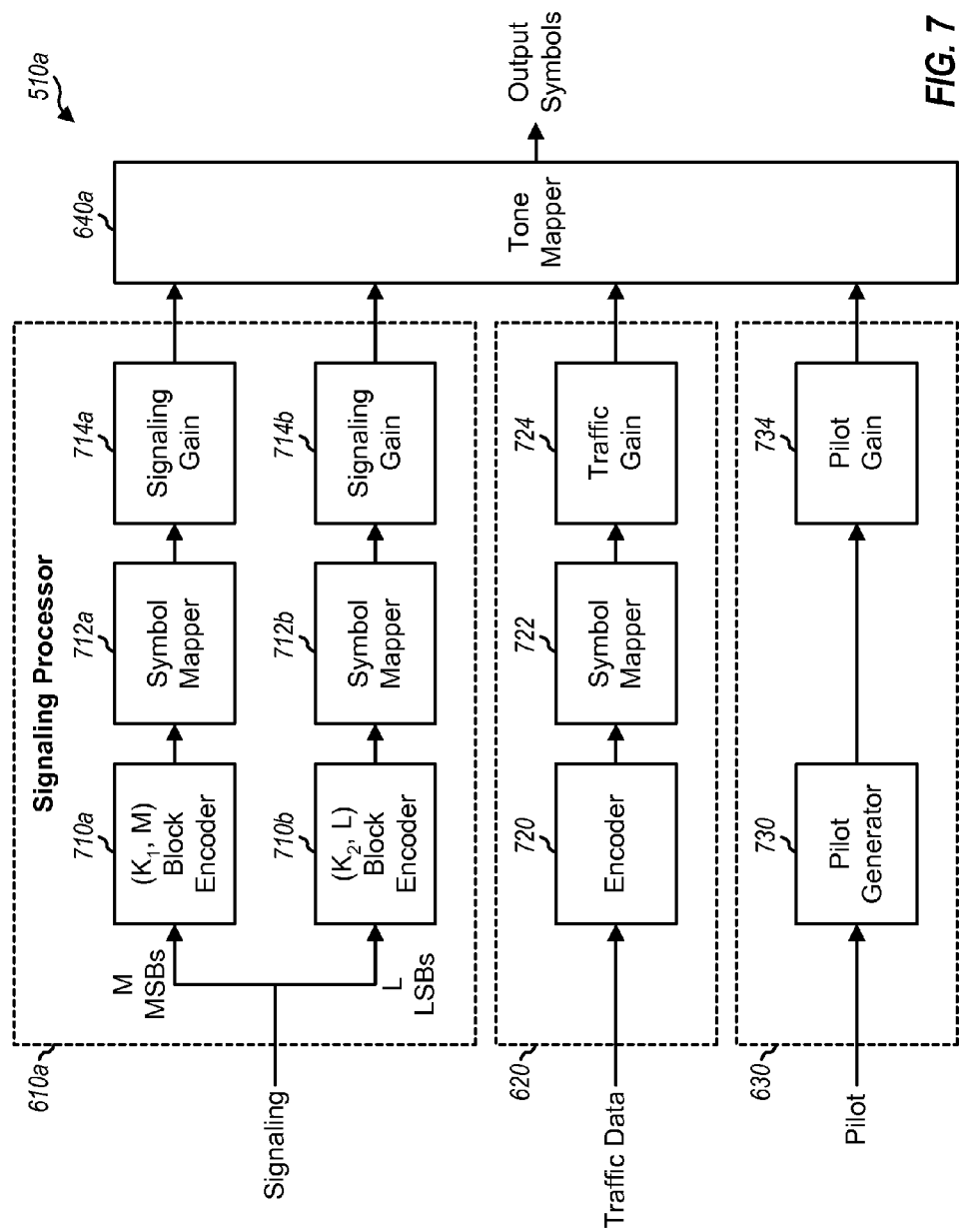
FIG. 7 shows a signaling processor that sends signaling in multiple parts.

FIG. 7 shows a block diagram of a transmit processor 510a, which is one design of transmit processor 510 in FIG. 6. In this design, the signaling for access terminal 120x may be partitioned into two parts and sent on two subsets of tones. One subset may include $K_1$ tones, and the other subset may include $K_2$ tones, where $K=K_1+K_2$. Within a signaling processor 610a, which is one design of signaling processor 610 in FIG. 6, a block encoder 710a may encode M most significant bits (MSBs) of the signaling with a ($K_1$, M) block code and provide $K_1$ code bits. A symbol mapper 712a may map the $K_1$ code bits to $K_1$ modulation symbols, e.g., based on BPSK. A gain unit 714a may scale the $K_1$ modulation symbols to obtain the desired transmit power for the signaling and provide $K_1$ signaling symbols. A block encoder 710b may encode L least significant bits (LSBS) of the signaling with a ($K_2$, L) block code and provide $K_2$ code bits. A symbol mapper 712b may map the $K_2$ code bits to $K_2$ modulation symbols. A gain unit 714b may scale the $K_2$ modulation symbols to obtain the desired transmit power for the signaling and provide $K_2$ signaling symbols. In one design, M=L=5, $K_1=K_2=16$, and each block encoder 710 may implement a (16, 5) block code. Other values may also be used for M, L, $K_1$ and $K_2$.

In one design, an orthogonal code may be used for the signaling and may map a B-bit signaling value to a $2^B$-bit codeword. For example, a Walsh code may map four possible 2-bit signaling values to codewords of 0000, 0101, 0011 and 0110. In another design, a bi-orthogonal code may be used for the signaling and may map a B-bit signaling value to a $2^{B-1}$-bit codeword. For example, a bi-orthogonal code may map four possible 2-bit signaling values to codewords of 00, 11, 01 and 10. A B-bit bi-orthogonal code may use all codewords in a (B−1)-bit orthogonal code as well as the complementary codewords. Other codes may also be used for the signaling, as described below.

The partitioning of the signaling into multiple parts may allow for reduction of the number of tones used to send the signaling when encoded with an orthogonal code or a bi-orthogonal code. For example, an orthogonal code may map a 10-bit signaling value to a 1024-bit codeword. This 10-bit signaling may be partitioned into two 5-bit parts, each 5-bit part may be mapped to a 32-bit codeword, and a total of 64 bits may be generated for the 10-bit signaling value. The partitioning of the signaling into multiple parts may be based on various considerations such as the number of signaling bits to send, the number of tones to use for the signaling, the desired coding gain, detection performance, etc.

Within traffic processor 620, an encoder 720 may encode the traffic data for scheduled access terminal 120x based on the data rate selected for the access terminal and provide code bits. A symbol mapper 722 may map the code bits to modulation symbols based on a modulation scheme determined by the selected data rate. A gain unit 724 may scale the modulation symbols to obtain the desired transmit power for the traffic data and provide data symbols. Within pilot processor 630, a pilot generator 730 may generate symbols for pilot. A gain unit 734 may scale the symbols from generator 730 to obtain the desired transmit power for pilot and provide pilot symbols. A tone mapper 640a may map the 32 signaling symbols from processor 610a to the 32 tones used for signaling, map the data symbols from processor 620 to tones used for traffic data, and map the pilot symbols from processor 630 to tones used for pilot.

The signaling may also be partitioned into more than two parts, encoded separately, and sent on more than two subsets of tones. In one design, 13-bit signaling for access terminal 120x may be partitioned into three parts—a first 4-bit part that may be encoded with an (8, 4) block code and mapped to 8 tones, a second 4-bit part that may also be encoded with the (8, 4) block code and mapped to another 8 tones, and a third 5-bit part that may be encoded with a (16, 5) block code and mapped to another 16 tones. In another design, the 13-bit signaling may be partitioned into four parts—a first 3-bit part that may be encoded with a (4, 3) block code and mapped to four tones, a second 3-bit part that may also be encoded with the (4, 3) block code and mapped to another four tones, a third 3-bit part that may also be encoded with the (4, 3) block code and mapped to another four tones, and a fourth 4-bit part that may be encoded with an (8, 4) block code and mapped to another eight tones. The signaling may also be encoded with a single block code and sent on one set of tones.

Figure 8:
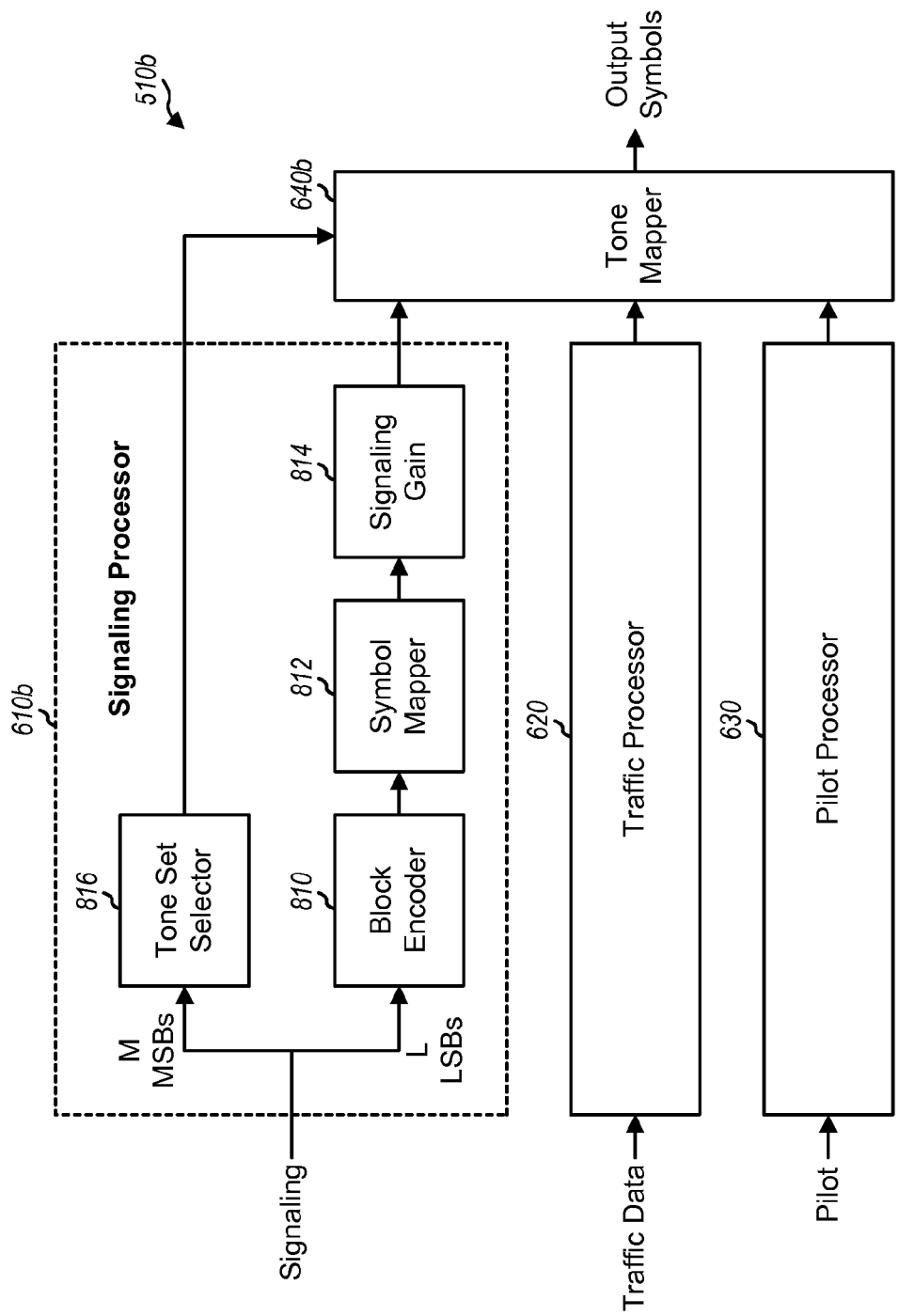
FIG. 8 shows a block diagram of a transmit processor according to one embodiment.

FIG. 8 shows a block diagram of a transmit processor 510b, which is another design of transmit processor 510 in FIG. 6. In this design, the signaling for access terminal 120x may be sent on one of S possible sets of tones, with each set including K tones, where S and K may be any integer values. Within a signaling processor 610b, which is another design of signaling processor 610 in FIG. 6, a block encoder 810 may encode L LSBs of the signaling with a (K, L) block code and provide K code bits. A symbol mapper 812 may map the K code bits to K modulation symbols. A gain unit 814 may scale the K modulation symbols and provide K signaling symbols. A selector 816 may receive M MSBs of the signaling and select one of S possible sets of tones based on the M MSBs, where $S \geq 2^M$. A tone mapper 640b may map the K signaling symbols from processor 610b to the K tones in the selected set and may map the data and pilot symbols to tones used for traffic data and pilot, respectively.

Table 2 gives some example designs of signaling processor 610b in FIG. 8. These designs assume that the signaling includes P=10 bits, a total of 512 tones may be used to send the signaling, and BPSK is used for the signaling. Other values may also be used for S, K, M and/or L for other signaling sizes, other modulation schemes, etc. For example, QPSK may be used instead of BPSK, and the number of tones may be reduced by half.

TABLE 2

| Set Size | Num of tone sets S | Num of tones/set K | Num of MSBs M | Num of LSBs L | Block Code (K, L) |
|---|---|---|---|---|---|
| 256-tone set | 2 | 256 | 1 | 9 | (256, 9) |
| 128-tone set | 4 | 128 | 2 | 8 | (128, 8) |
| 64-tone set | 8 | 64 | 3 | 7 | (64, 7) |
| 32-tone set | 16 | 32 | 4 | 6 | (32, 6) |
| 16-tone set | 32 | 16 | 5 | 5 | (16, 5) |
| 8-tone set | 64 | 8 | 6 | 4 | (8, 4) |
| 4-tone set | 128 | 4 | 7 | 3 | (4, 3) |

Sending the signaling on one of multiple sets of tones may provide certain advantages. Some signaling bits may be sent via the specific set of tones selected for use, and the remaining signaling bits may be sent on the selected set of tones. The number of sets and the number of tones in each set may be selected based on various considerations such as the number of signaling bits to send, the number of tones available to send the signaling, the desired coding gain, detection performance, etc.

Figure 9:
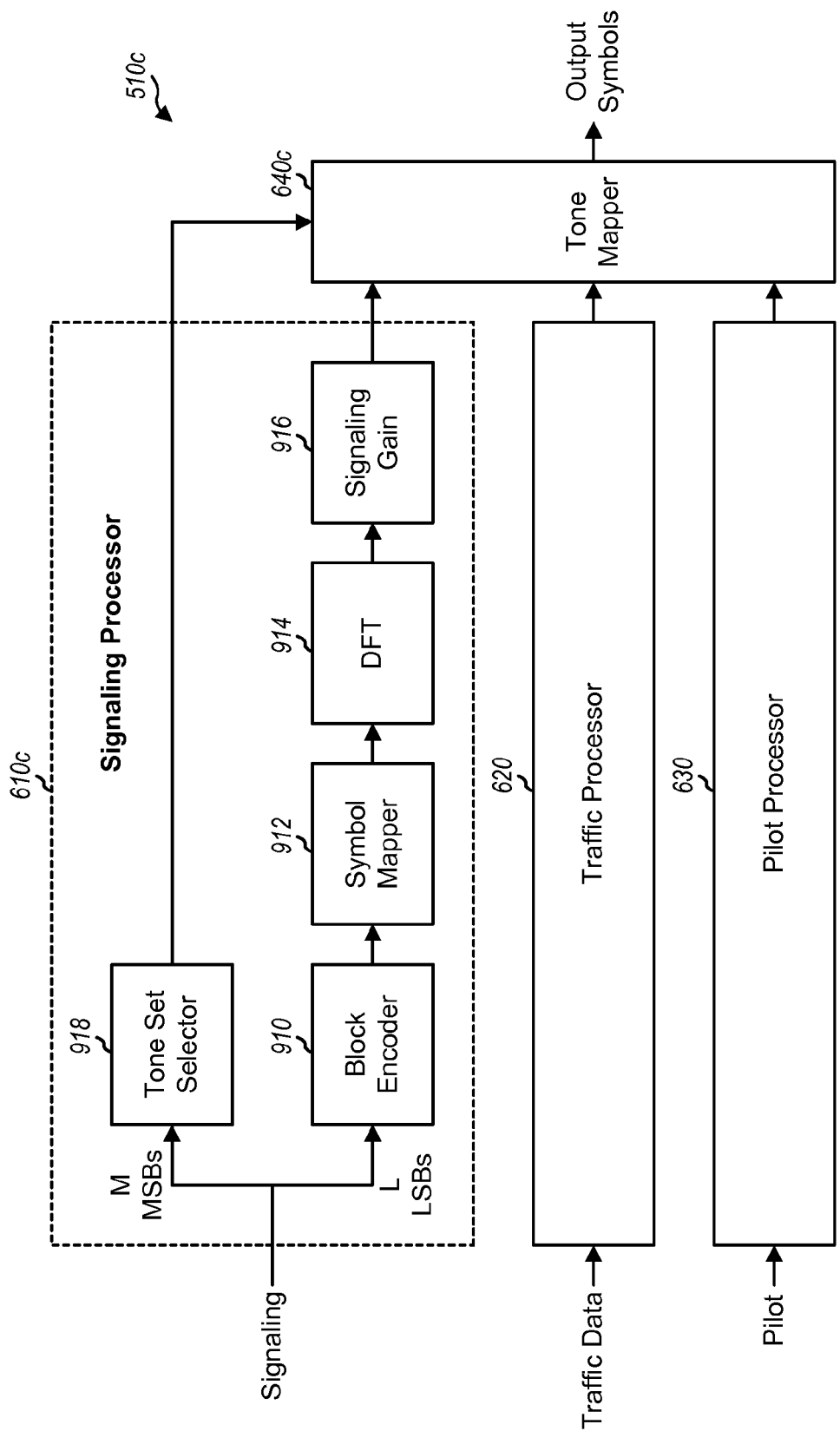
FIG. 9 shows a signaling processor that sends signaling on a selected set of tones.

FIG. 9 shows a block diagram of a transmit processor 510c, which is yet another design of transmit processor 510 in FIG. 6. In this design, the signaling for access terminal 120x may be sent on one of S possible sets of tones, with each set including K tones. Within a signaling processor 610c, which is yet another design of signaling processor 610 in FIG. 6, a block encoder 910 may encode L LSBs of the signaling with a block code and provide code bits. A symbol mapper 912 may map the code bits to K modulation symbols. A discrete Fourier transform (DFT) unit 914 may transform the K modulation symbols with a K-point DFT and provide K frequency-domain symbols. Unit 914 may also be replaced with some other unitary transformation (with non-zero entries) that can spread each modulation symbol across all or many of the tones. A gain unit 916 may scale the frequency-domain symbols and provide K signaling symbols. A selector 918 may receive M MSBs of the signaling and select one of S sets of tones based on the M MSBs. A tone mapper 640d may map the K signaling symbols from processor 610c to the K tones for the selected set and may map the data and pilot symbols to tones used for traffic data and pilot, respectively.

The DFT processing by unit 914 may provide frequency diversity for the L LSBs of the signaling. Equalization may be used at the receiver to improve performance.

In the designs shown in FIGS. 8 and 9, the MAC_ID may be sent in the MSB portion of the signaling. In this case, each access terminal may be mapped to one of the S possible sets of tones based on its MAC_ID. Each access terminal may then detect for signaling on only its assigned set of tones.

Figure 10:
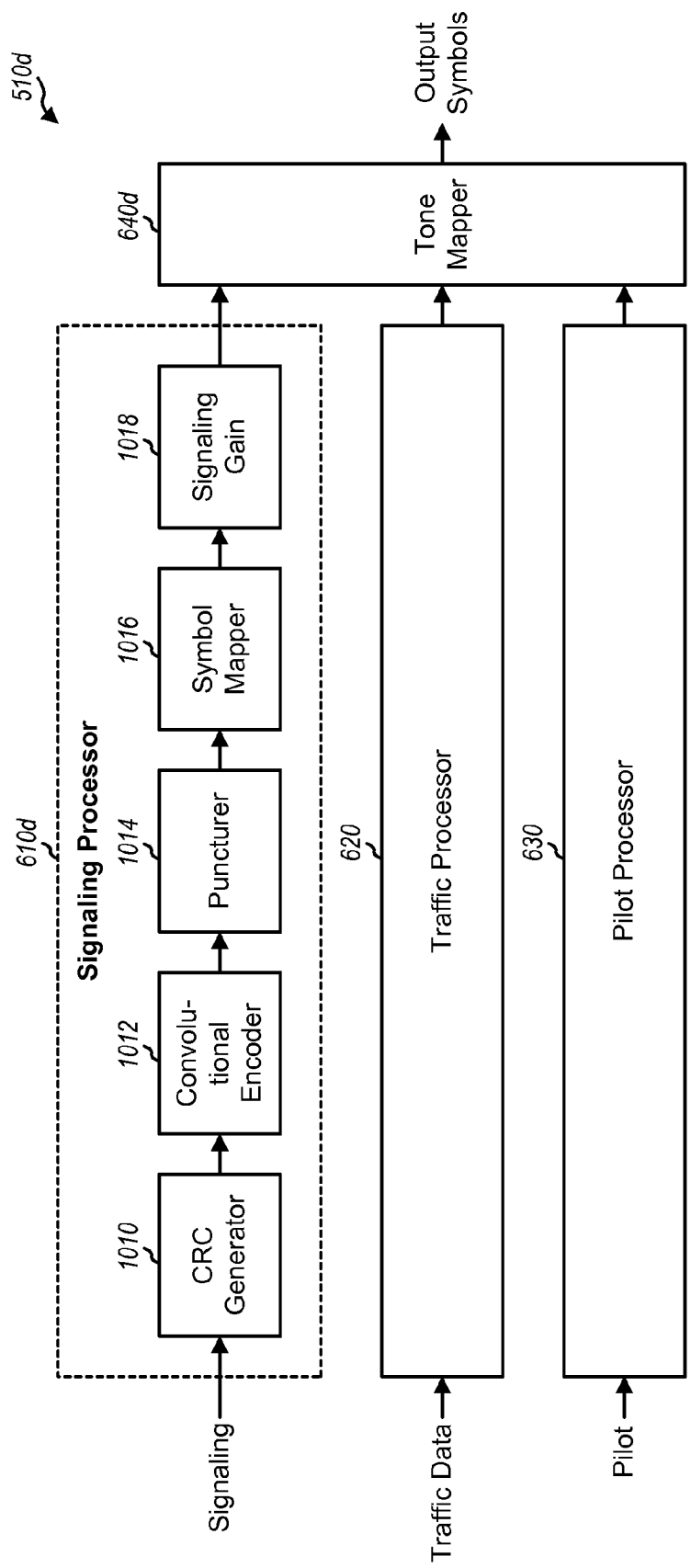
FIG. 10 shows a signaling processor that spreads signaling symbols across tones.

FIG. 10 shows a block diagram of a transmit processor 510d, which is yet another design of transmit processor 510 in FIG. 6. In this design, the signaling for access terminal 120x may be sent on a set of K tones. Within a signaling processor 610d, which is yet another design of signaling processor 610 in FIG. 6, a cyclic redundancy check (CRC) generator 1010 may generate a CRC for the signaling. The CRC may be used for error detection by access terminal 120x. A convolutional encoder 1012 may encode the CRC and signaling and provide code bits. A puncture unit 1014 may puncture or delete some of the code bits to obtain the desired number of code bits. A symbol mapper 1016 may map the code bits from unit 1014 to K modulation symbols. A gain unit 1018 may scale the modulation symbols and provide K signaling symbols. A tone mapper 640d may map the K signaling symbols from processor 610d to the K tones for the selected set and may map the data and pilot symbols to tones used for traffic data and pilot, respectively.

In one design, CRC generator 1010 may generate a 10-bit CRC for 10-bit signaling. Convolutional encoder 1012 may append 8 tail bits and then encode the 28 total bits with a rate 1/3 convolutional code to obtain 84 code bits. Puncture unit 1014 may puncture 20 of the 84 code bits and provide 64 code bits. Symbol mapper 1016 may map the 64 code bits to 32 QPSK modulation symbols, which may be mapped to K=32 tones. Other values may also be used for signaling processor 610d.

Figure 11:
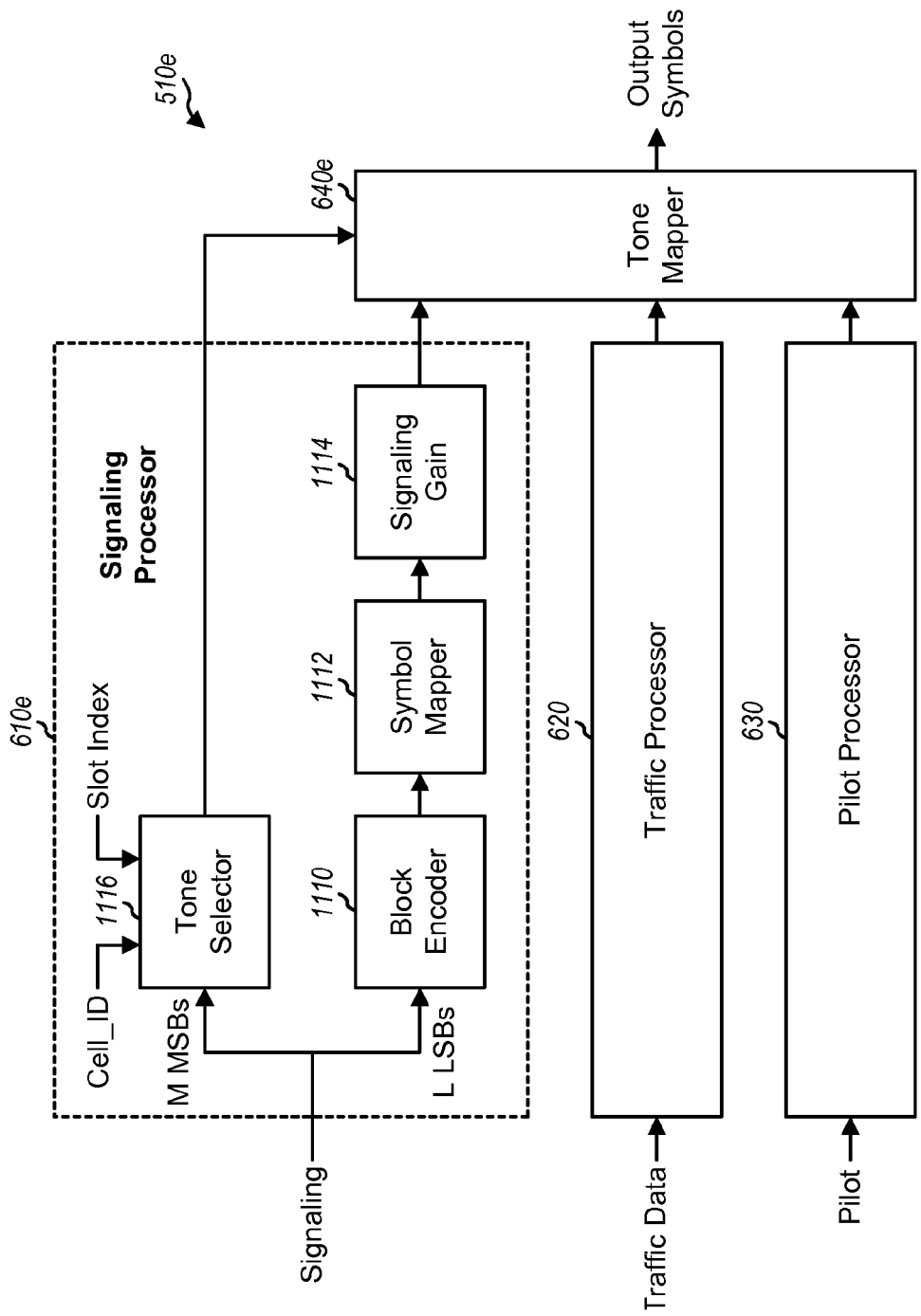
FIG. 11 shows a signaling processor that sends signaling on pseudo-randomly selected tones.

FIG. 11 shows a block diagram of a transmit processor 510e, which is yet another design of transmit processor 510 in FIG. 6. In this design, the signaling for access terminal 120x may be sent on K tones that may be pseudo-randomly selected from among all tones assigned to access terminal 120x.

Within a signaling processor 610e, which is yet another design of signaling processor 610 in FIG. 6, a block encoder 1110 may encode L LSBs of the signaling with a block code and provide code bits. A symbol mapper 1112 may map the code bits to K modulation symbols. A gain unit 1114 may scale the K modulation symbols and provide K signaling symbols. A tone selector 1116 may receive M MSBs of the signaling and possibly other information such as a cell_ID, a slot index, etc. Selector 1116 may pseudo-randomly select K tones from among all tones assigned to access terminal 120x based on the inputs. A tone mapper 640e may map the K signaling symbols from processor 610e to the K pseudo-randomly selected tones and may map the data and pilot symbols to tones used for traffic data and pilot, respectively.

In the design shown in FIG. 11, the signaling may be sent using "flash" techniques, which send information on a small number of tones with (e.g., 6 dB or more) higher transmit power than traffic transmit power. Collision between the signaling for different access terminals in the same cell may be avoided by sending the signaling for each access terminal on the tones assigned to that access terminal. Collision between the signaling for different access terminals in different cells may be reduced by pseudo-randomly selecting the tones. In one design, the M MSBs may include the 8-bit MAC ID, and the L LSBs may include the remaining part of the signaling. For the 10-bit signaling design described above, the L LSBs may include the 2-bit rate adjustment, and K=2 tones may be pseudo-randomly selected and used to send the signaling. For the 13-bit signaling design described above, the L LSBs may include the 2-bit rate adjustment, the 2-bit assignment size indicator, and the 1-bit sticky assignment indicator, and K=5 tones may be pseudo-randomly selected and used to send the signaling. The tones may also be selected from among a designated group of tones, from all tones in the slot, etc.

FIGS. 7 through 11 show some example designs of signaling processor 610 in FIG. 6. Signaling processor 610 may also be implemented with other designs.

In some designs described above, the entire signaling or part of the signaling may be encoded with one or more block encoders to generate code bits. In one design, the signaling may be encoded with one or more static block encoders. A static block encoder has a predetermined codebook and maps each possible signaling value to one specific codeword or output value. A static block encoder may implement any block code known in the art such as an orthogonal code, a bi-orthogonal code, a Hamming code, a Reed-Muller code, a Reed-Solomon code, a repetition code, etc.

In another design, the signaling may be encoded with one or more dynamic block encoders. A dynamic block encoder has a time-varying codebook that changes over time. For example, the codebook may change from slot to slot, and a given signaling value may be mapped to different codewords in different slots. A dynamic block encoder may implement a pseudo-random codebook, which may be derived based on a pseudo-random number (PN) sequence. Each access terminal may be assigned a unique 48-bit PN sequence that may be updated at the start of each slot. Sixteen codewords of length 32 may be defined based on the 48-bit PN sequence, e.g., the m-th codeword may comprise bits m through m+31 of the PN sequence, where m=0, 1, ..., 15. The correlation between any two codewords in the pseudo-random codebook would be small due to the pseudo-random nature of the PN sequence. Different codebooks may be used for different access terminals and generated based on their different PN sequences. Furthermore, the codebook for each access terminal may vary over time based on the PN sequence of that access terminal. These codebooks may be generated easily by the access point and each access terminal. The use of pseudo-random codebooks may reduce false alarm under certain channel conditions. A false alarm is declaration of a codeword when none was sent or signaling is intended for a different access terminal.

The signaling for access terminal 120x may be sent in an adaptive manner based on channel conditions to ensure reliable reception of the signaling by access terminal 120x. In one design, the signaling may be sent in a variable number of tones, which may be determined based on the channel conditions. The channel conditions may be ascertained, e.g., based on the DRC feedback from access terminal 120x. In general, more tones may be used for poor channel conditions (e.g., low SNR), and fewer tones may be used for good channel conditions (e.g., high SNR). In one design, the signaling may be sent on 8, 16, 32, 64, 128, 256 or 512 tones depending on the channel conditions, e.g., the DRC feedback. The signaling may be sent at a fixed signaling-to-pilot power ratio.

In another design, the signaling for access terminal 120x may be sent in a fixed number of tones, but the transmit power for the signaling may be varied based on the channel conditions. In general, more transmit power (or higher signaling gain) may be used for poor channel conditions, and less transmit power (or lower signaling gain) may be used for good channel conditions. The signaling transmit power may be a function of the DRC feedback.

The signaling for access terminal 120x may be sent from one or multiple antennas at the access point. In one design, the signaling may be sent from one antenna even when multiple transmit antennas are available. In another design, the signaling may be precoded (or spatially processed) with a transmit steering vector and sent from multiple antennas. In this design, the signaling may be sent from one virtual antenna formed with the transmit steering vector. In yet another design, the signaling may be space-time block coded and sent from multiple antennas, e.g., from two antennas using space-time transmit diversity (STTD). The signaling may be precoded in similar manner as traffic and pilot.

Figure 12:
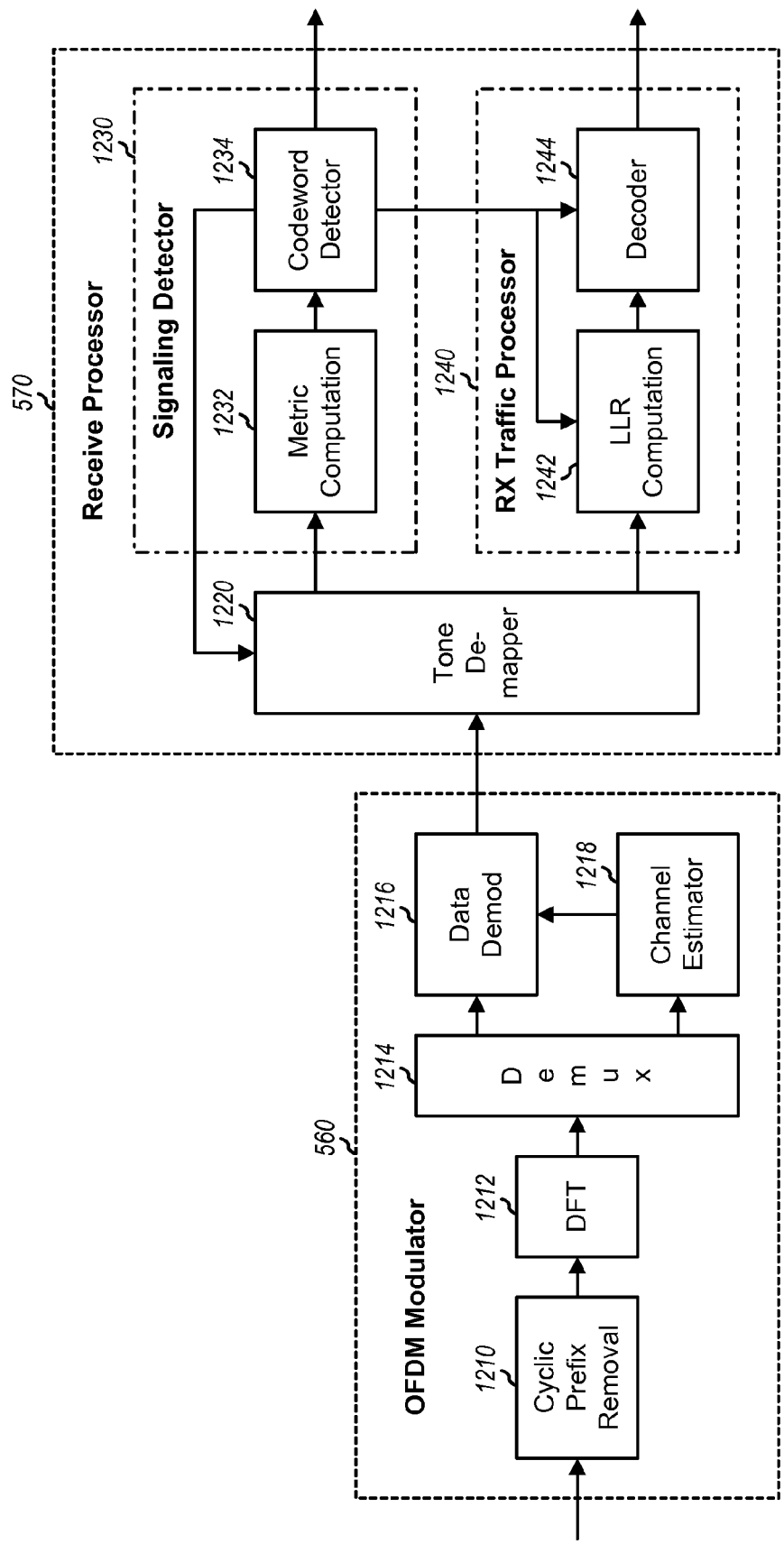
FIG. 12 shows a block diagram of an OFDM demodulator and a receive processor.

FIG. 12 shows a block diagram of a design of OFDM demodulator 560 and receive processor 570 and at access terminal 120x in FIG. 5. Within OFDM demodulator 560, a cyclic prefix removal unit 1210 may obtain N+C received samples in each OFDM symbol period, remove the cyclic prefix, and provide N received samples for the useful portion. A DFT unit 1212 may perform an N-point DFT on the N received samples and provide N received symbols for the N subcarriers. A demultiplexer 1214 may provide received symbols for traffic data and signaling to a data demodulator 1216 and provide received symbols for pilot to a channel estimator 1218. Channel estimator 1218 may derive a channel estimate based on the received symbols for pilot. Data demodulator 1216 may perform data detection (e.g., matched filtering, equalization, etc.) on the received symbols for traffic data and signaling with the channel estimate from channel estimator 1218 and provide received data symbols and received signaling symbols.

Within receive processor 570, a tone demapper 1220 may provide the received signaling symbols to a signaling detector 1230 and provide the received data symbols to a receive (RX) traffic processor 1240. Tone demapper 1220 may determine the tones used for the signaling in the same manner as access point 110x, e.g., based on all or a portion of the MAC_ID of access terminal 120x for the designs shown in FIGS. 8, 9 and 11 and based on a predetermined set of tones for the designs shown in FIGS. 7 and 10. Signaling detector 1230 may detect for signaling sent to access terminal 120x based on the received signaling symbols and provide detected signaling. Within signaling detector 1230, a metric computation unit 1232 may compute a metric for each codeword that might be sent for the signaling. A codeword detector 1234 may determine whether any codeword was sent to access terminal 120x based on the metric and, if a codeword was sent, may provide the information associated with this codeword as the detected signaling. Within RX traffic processor 1240, a unit 1242 may compute log-likelihood ratios (LLRs) for code bits based on the detected signaling (e.g., the rate adjustment) from signaling detector 1230. A decoder 1244 may decode the LLRs based on the detected signaling and provide decoded data for access terminal 120x.

The received signaling symbols at access terminal 120x may be expressed as:

$$r_k = \sqrt{E_k} c_k s_k + n_k, \quad \text{Eq (1)}$$

where $s_k$ is a signaling symbol sent on tone k,
$c_k$ is a complex channel gain for tone k,
$E_k$ is the transmit power for the signaling symbol sent on tone k,
$n_k$ is noise for tone k, and
$r_k$ is a received signaling symbol for tone k.

In one design, unit 1232 may compute a metric $Q_m$ for each possible codeword m for the signaling, as follows:

$$Q_m = \frac{\operatorname{Re}\left(\sum_{k=1}^{K} r_k \hat{c}_k^* s_{k,m}^*\right)}{\sqrt{\dfrac{N_t}{2} \sum_{k=1}^{K} |\hat{c}_k|^2}}, \quad \text{Eq (2)}$$

where $\hat{c}_k$ is an estimate of the channel gain for tone k,
$s_{k,m}$ is a signaling symbol for tone k for the m-th codeword,
$N_t$ is noise variance, which may be estimated, and
"*" denotes a complex conjugate and "Re" denotes the real part.

The metric in equation (2) may provide good detection performance in terms of false alarm from the signaling for other access terminals.

In another design, unit 1232 may compute a metric $Q_m$ for each possible codeword m, as follows:

$$Q_m = \frac{\operatorname{Re}\left(\sum_{k=1}^{K} r_k \hat{c}_k^* s_{k,m}^*\right)}{\sqrt{\dfrac{1}{2}\sum_{k=1}^{K} E_k |\hat{c}_k|^4 + \dfrac{N_t}{2}\sum_{k=1}^{K} |\hat{c}_k|^2}}. \quad \text{Eq (3)}$$

The metric in equation (3) may provide good detection performance in terms of false alarm from traffic data and signaling for other access terminals and also when the received codewords are not orthogonal.

Signaling detector 1230 may detect for signaling for each of the different possible resource assignments for access terminal 120x. For each possible resource assignment, unit 1232 may compute metric $Q_m$ for each possible codeword that might be sent to access terminal 120x for the signaling. Detector 1234 may compare the computed metric for each codeword against a threshold and may declare a detected codeword if the metric exceeds the threshold. A single threshold may be used for all channel scenarios, e.g., different power delay profiles, high and low geometries/SNRs, high and low mobility/Doppler, etc. Alternatively, different thresholds may be used for different channel scenarios. The threshold(s) may be selected to achieve the desired false alarm probability and detection probability.

FIG. 12 shows a design of signaling detector 1230 that may be used for signaling sent with block encoding, e.g., as shown in FIGS. 7, 8, and 11. The block decoding may also be performed in other manners. If the signaling is sent with DFT preceding, e.g., as shown in FIG. 9, then the signaling detector may perform an IDFT prior to the block decoding. If the signaling is sent with convolutional encoding, e.g., as shown in FIG. 10, then the signaling detector may perform Viterbi decoding.

Figure 13:
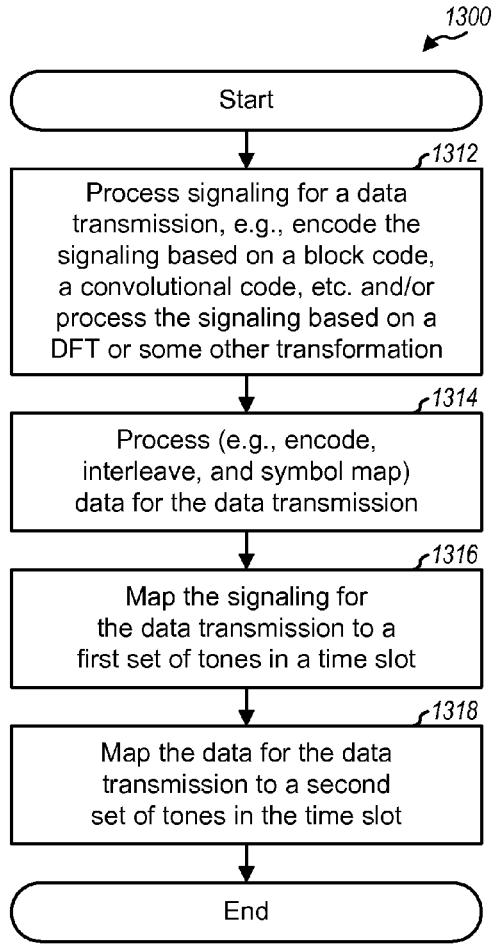
FIG. 13 shows a process for transmitting data and signaling.

FIG. 13 shows a design of a process 1300 for transmitting data and signaling. Process 1300 may be performed by an access point for transmission on the downlink or by an access terminal for transmission on the uplink. Signaling for a data transmission may be processed, e.g., encoded based on a block code, a convolutional code, etc. (block 1312). The block code may be an orthogonal code, a bi-orthogonal code, a static block code, a dynamic block code, a pseudo-random block code, etc. The pseudo-random block code may be based on a PN sequence for a receiver (e.g., an access terminal) to which the data transmission is sent or a PN sequence specific for the receiver. The signaling may also be partitioned into multiple parts, and each part of the signaling may be encoded with a respective code. The signaling may also be processed with a DFT or some other transformation to spread each signaling symbol across multiple tones. The signaling may comprise an identifier of the receiver (e.g., the access terminal), information indicative of a data rate for the data transmission, information indicative of resource assignment for the data transmission, etc. Data for the data transmission may be processed, e.g., encoded, interleaved, and symbol mapped (block 1314).

The signaling for the data transmission may be mapped to a first set of tones in a time slot (block 1318). The data for the data transmission may be mapped to a second set of tones in the time slot (block 1316). The first and second sets of tones may be among the tones assigned for the data transmission. The tones in the first set may be (i) distributed across the system bandwidth and/or (i) distributed across the time slot or located in an earlier portion of the time slot. The entire signaling may be sent on the first set of tones, e.g., as shown in FIGS. 7 and 10. Alternatively, the signaling may comprise first and second parts, the first set of tones may be selected based on the first part of the signaling, and the second part of the signaling may be sent on the first set of tones, e.g., as shown in FIGS. 8, 9 and 11.

The number of tones in the first set and/or the transmit power for the signaling may be selected based on channel conditions for the data transmission. The time slot may comprise one or more traffic segments time division multiplexed with one or more overhead segments. The first and second sets of tones may be located in the traffic segment(s).

Figure 14:
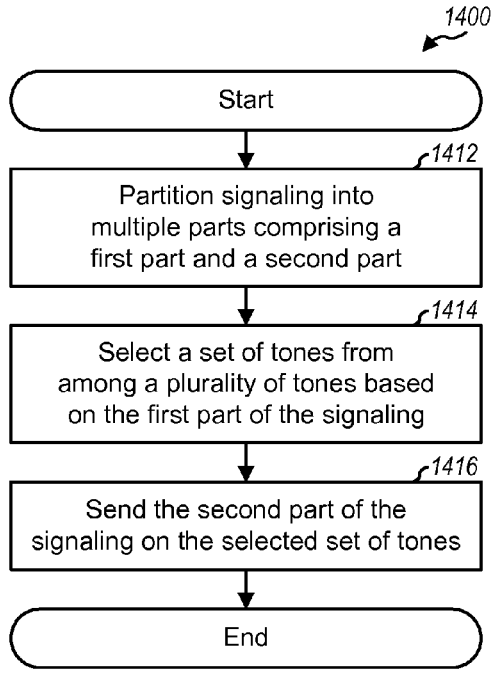
FIG. 14 shows a process for sending signaling.

FIG. 14 shows a design of a process 1400 for sending signaling. Process 1400 may also be performed by an access point or an access terminal. Signaling may be partitioned into multiple parts comprising a first part and a second part (block 1412). The signaling may comprise any information for a data transmission, and each part may be of any size. For example, the first part of the signaling may comprise all or a portion of an identifier of a receiver (e.g., an access terminal) for a data transmission.

A set of tones may be selected from among a plurality of tones based on the first part of the signaling (block 1414). The plurality of tones may be tones assigned for the data transmission or tones available to send the signaling. The set of tones may be selected from among multiple sets of tones based on the first part of the signaling. The set of tones may also be pseudo-randomly selected from among the plurality of tones based on the first part of the signaling, an identifier of a transmitter (e.g., an access point or cell) sending the data transmission, an index of a time slot in which the data transmission is sent, etc.

The second part of the signaling may be encoded based on a static block code, a time-varying block code, a pseudo-random block code, a convolutional code, etc. The second part of the signaling may also be processed based on a DFT or some other transformation. The second part of the signaling may be sent on the selected set of tones (block 1416). The second part of the signaling may be sent with higher transmit power than transmit power for data to improve reliability.

Figure 15:
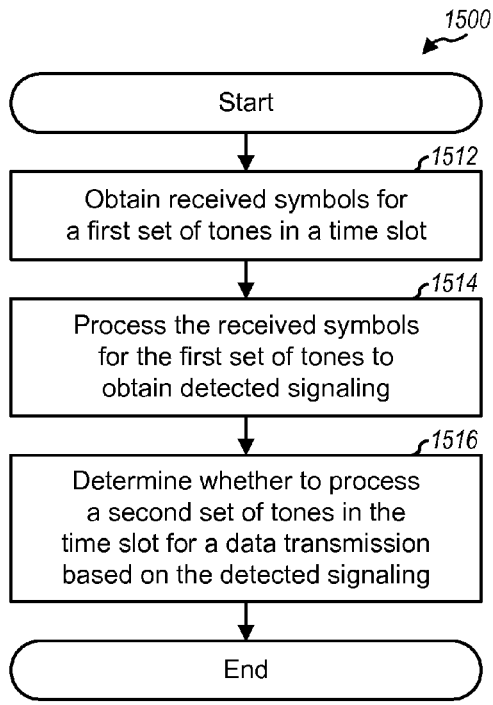
FIG. 15 shows a process for receiving data and signaling.

FIG. 15 shows a design of a process 1500 for receiving data and signaling. Process 1500 may be performed by an access terminal for transmission on the downlink or by an access point for transmission on the uplink. Received symbols for a first set of tones in a time slot may be obtained, e.g., by performing OFDM demodulation on received samples (block 1512). The received symbols for the first set of tones may be processed to obtain detected signaling (block 1514). The first set of tones may be determined from among multiple sets of tones based on an identifier of a receiver (e.g., an access terminal). The first set of tones may also be determined from among a plurality of tones assignable for data transmission based on the identifier of the receiver (e.g., the access terminal), the identifier of a transmitter (e.g., an access point or cell), a time slot index, etc. For block 1514, a metric may be computed for each of multiple codewords based on the received symbols. Whether any codeword was sent may be determined based on the computed metric for each codeword. The detected signaling may be obtained based on a codeword determined to have been sent.

Whether or not to process a second set of tones in the time slot for a data transmission may be determined based on the detected signaling (block 1516). The detected signaling may indicate no data transmission is sent for the receiver if none of the codewords is determined to have been sent. If the detected signaling indicates that data transmission is sent, then received symbols for the second set of tones may be processed to recover the transmitted data. The second set of tones, a data rate for the data transmission, and/or other information may be obtained from the detected signaling.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
at least one processor to map signaling for a data transmission to a first set of tones in a time slot, and to map data for the data transmission to a second set of tones in the time slot, wherein a first part of the signaling comprises an identifier for an access terminal to which the data transmission is sent, and wherein the at least one processor selects the first set of tones from among a plurality of tones based on the first part of the signaling and determines transmit power for the signaling based on channel conditions for the data transmission; and
a memory coupled to the at least one processor.

2. The apparatus of claim 1, wherein the at least one processor assigns the plurality of tones for the data transmission.

3. The apparatus of claim 1, wherein the at least one processor encodes the signaling based on at least one of an orthogonal code, a bi-orthogonal code, a block code, a time-varying block code, a pseudo-random block code, and a convolutional code.

4. The apparatus of claim 1, wherein the at least one processor encodes the signaling based on a pseudo-random block code determined based on a pseudo-random number (PN) sequence for an access terminal to which the data transmission is sent.

5. The apparatus of claim 1, wherein the at least one processor partitions the signaling into multiple parts, encodes each part of the signaling with a respective code, and sends multiple encoded parts of the signaling on the first set of tones.

6. The apparatus of claim 1, wherein the at least one processor processes the signaling with a discrete Fourier transform (DFT) or a unitary transformation prior to mapping to the first set of tones.

7. The apparatus of claim 1, wherein the at least one processor sends a second part of the signaling on the first set of tones.

8. The apparatus of claim 1, wherein the at least one processor selects the number of tones in the first set based on channel conditions for the data transmission.

9. The apparatus of claim 1, wherein the at least one processor pseudo-randomly selects the first set of tones.

10. The apparatus of claim 1, wherein the at least one processor processes the signaling with a transmit steering vector or a space-time block code prior to transmission via multiple antennas.

11. The apparatus of claim 1, wherein the data transmission is for the access terminal, and wherein the signaling comprises at least one of information indicative of a data rate for the data transmission or information indicative of resource assignment for the data transmission.

12. The apparatus of claim 1, wherein the tones in the first set are distributed across system bandwidth.

13. The apparatus of claim 1, wherein the tones in the first set are located in an early portion of the time slot.

14. The apparatus of claim 1, wherein the time slot comprises at least one traffic segment time division multiplexed with at least one overhead segment, and wherein the first and second sets of tones are located in the at least one traffic segment.

15. A method comprising:
mapping signaling for a data transmission to a first set of tones in a time slot, wherein a first part of the signaling comprises an identifier for an access terminal to which the data transmission is sent;
selecting the first set of tones from among a plurality of tones based on the first part of the signaling and determining transmit power for the signaling based on channel conditions for the data transmission; and
mapping data for the data transmission to a second set of tones in the time slot.

16. The method of claim 15, further comprising:
processing the signaling based on at least one of an orthogonal code, a bi-orthogonal code, a block code, a time-varying block code, a pseudo-random block code, a convolutional code, a discrete Fourier transform (DFT), a unitary transformation, a transmit steering vector, and a space-time block code.

17. The method of claim 15, wherein the mapping the signaling to the first set of tones comprises sending a second part of the signaling on the first set of tones.

18. An apparatus comprising:
means for mapping signaling for a data transmission to a first set of tones in a time slot, wherein a first part of the signaling comprises an identifier for an access terminal to which the data transmission is sent, and wherein the means for mapping the signaling comprises means for selecting the first set of tones from among a plurality of tones based on the first part of the signaling and determining transmit power for the signaling based on channel conditions for the data transmission; and
means for mapping data for the data transmission to a second set of tones in the time slot.

19. The apparatus of claim 18, further comprising:
means for processing the signaling based on at least one of an orthogonal code, a bi-orthogonal code, a block code, a time-varying block code, a pseudo-random block code, a convolutional code, a discrete Fourier transform (DFT), a unitary transformation, a transmit steering vector, and a space-time block code.

20. The apparatus of claim 18, wherein the means for mapping the signaling to the first set of tones comprises means for sending a second part of the signaling on the first set of tones.

21. A computer program product, comprising:
a non-transitory computer-readable medium comprising:
code for causing a computer to map signaling for a data transmission to a first set of tones in a time slot, wherein a first part of the signaling comprises an identifier for an access terminal to which the data transmission is sent;
code for causing the computer to select the first set of tones from among the plurality of tones based on the first part of the signaling and determine transmit power for the signaling based on channel conditions for the data transmission; and
code for causing the computer to map data for the data transmission to a second set of tones in the time slot.

22. The computer program product of claim 21, wherein the non-transitory computer-readable medium further comprises:
code for causing the computer to process the signaling based on at least one of an orthogonal code, a bi-orthogonal code, a block code, a time-varying block code, a pseudo-random block code, a convolutional code, a discrete Fourier transform (DFT), a unitary transformation, a transmit steering vector, and a space-time block code.

23. The computer program product of claim 21, wherein the non-transitory computer-readable medium further comprises:
code for causing the computer to send a second part of the signaling on the first set of tones.

24. An apparatus comprising:
at least one processor to partition signaling into multiple parts comprising a first part and a second part, to select a set of tones from among a plurality of tones based on the first part of the signaling, and to send the second part of the signaling on the selected set of tones, wherein the signaling comprises an identifier for an access terminal to which a data transmission is sent, and wherein the at least one processor selects the set of tones from among the plurality of tones based on the first part of the signaling and determines transmit power for the signaling based on channel conditions for the data transmission; and
a memory coupled to the at least one processor.

25. The apparatus of claim 24, wherein the signaling is for the data transmission, and wherein the plurality of tones are assigned for the data transmission.

26. The apparatus of claim 24, wherein multiple sets of tones are defined based on the plurality of tones.

27. The apparatus of claim 26, wherein each of the multiple sets comprises multiple tones distributed across system bandwidth and over a predetermined time interval.

28. The apparatus of claim 24, wherein the at least one processor pseudo-randomly selects the set of tones further based on at least one of an identifier of a cell sending the data transmission and an index of a time slot in which the data transmission is sent.

29. The apparatus of claim 24, wherein the at least one processor sends the second part of the signaling with higher transmit power than transmit power for data.

30. The apparatus of claim 24, wherein the at least one processor processes the second part of the signaling based on at least one of an orthogonal code, a bi-orthogonal code, a block code, a time-varying block code, a pseudo-random block code, a convolutional code, a discrete Fourier transform (DFT), a unitary transformation, a transmit steering vector, and a space-time block code.

31. A method comprising:
    partitioning signaling into multiple parts comprising a first part and a second part, wherein the first part of the signaling comprises an identifier for an access terminal to which a data transmission is sent;
    selecting a set of tones from among a plurality of tones based on the first part of the signaling and determining transmit power for the signaling based on channel conditions for the data transmission; and
    sending the second part of the signaling on the selected set of tones.

32. The method of claim 31, further comprising:
    processing the second part of the signaling based on at least one of an orthogonal code, a bi-orthogonal code, a block code, a time-varying block code, a pseudo-random block code, a convolutional code, a discrete Fourier transform (DFT), a unitary transformation, a transmit steering vector, and a space-time block code.

33. An apparatus comprising:
    means for partitioning signaling into multiple parts comprising a first part and a second part, wherein a first part of the signaling comprises an identifier for an access terminal to which a data transmission is sent;
    means for selecting a set of tones from among a plurality of tones based on the first part of the signaling and determining transmit power for the signaling based on channel conditions for the data transmission; and
    means for sending the second part of the signaling on the selected set of tones.

34. The apparatus of claim 33, further comprising:
    means for processing the second part of the signaling based on at least one of an orthogonal code, a bi-orthogonal code, a block code, a time-varying block code, a pseudo-random block code, a convolutional code, a discrete Fourier transform (DFT), a unitary transformation, a transmit steering vector, and a space-time block code.

* * * * *